No. 782,223. PATENTED FEB. 14, 1905.
R. DERDEYN.
DELINTING MACHINE.
APPLICATION FILED MAY 6, 1904.

2 SHEETS—SHEET 1.

WITNESSES:
M. E. Flaherty.
M. V. Foley.

INVENTOR:
Roman Derdeyn

No. 782,223. PATENTED FEB. 14, 1905.
R. DERDEYN.
DELINTING MACHINE.
APPLICATION FILED MAY 6, 1904.

2 SHEETS—SHEET 2.

WITNESSES:
M. E. Flaherty
M. V. Foley

INVENTOR:
Rouran Derdeyn

No. 782,223. Patented February 14, 1905.

UNITED STATES PATENT OFFICE.

ROMAN DERDEYN, OF VICKSBURG, MISSISSIPPI.

DELINTING-MACHINE.

SPECIFICATION forming part of Letters Patent No. 782,223, dated February 14, 1905.

Application filed May 6, 1904. Serial No. 206,615.

*To all whom it may concern:*

Be it known that I, ROMAN DERDEYN, a citizen of the United States, residing at Vicksburg, in the county of Warren and State of Mississippi, have invented a new and useful Improvement in Delinting-Machines, of which the following is a specification.

In Letters Patent of the United States issued on the application of W. C. Baxter, No. 659,840, dated October 16, 1900, there is shown a cotton-seed delinter having a grinding-roll comprising a series of disks of corundum or the like, each pair separated by a metallic disk having arms projecting therefrom, so shaped that when the grinding-roll is revolved the seed is not only agitated, but is pushed from the inlet toward the outlet of the machine. As shown in that patent, the cylindrical casing is somewhat smaller at the outlet end than at the inlet end, so that the seed - inclosing chamber will be slightly smaller at the outlet than at the inlet. In practice the same result is attained by making the grinding-roll slightly larger at the outlet than at the inlet end of the machine. The work of the Baxter machine has been quite satisfactory; but the most difficult part of the delinting process is to entirely denude the points of the seed of their lint. The Baxter machine has been very successful in denuding the other part of the seed; but the tips are not always clean when they leave the machine.

For the purpose of securing a more thorough cleaning of the seed I have substituted for the casing with which the roll is surrounded in the Baxter machine as built and between which and the roll the seed is contained a casing polygonal in cross-section—that is, having a number of sides, one of which is preferably a grating having openings through which the lint may be forced or drawn out, the other sides being of slabs of corundum or the like, which may be mounted upon wooden or iron backings and joined together and to the heads of the casing by suitable clamps or otherwise, as may be found desirable. By this means the cylinder or grinding-roll may be made shorter and the machine run with less power without reducing the total capacity thereof, because of the double grinding-surfaces.

My invention will be understood by reference to the drawings, in which—

Figure 1:
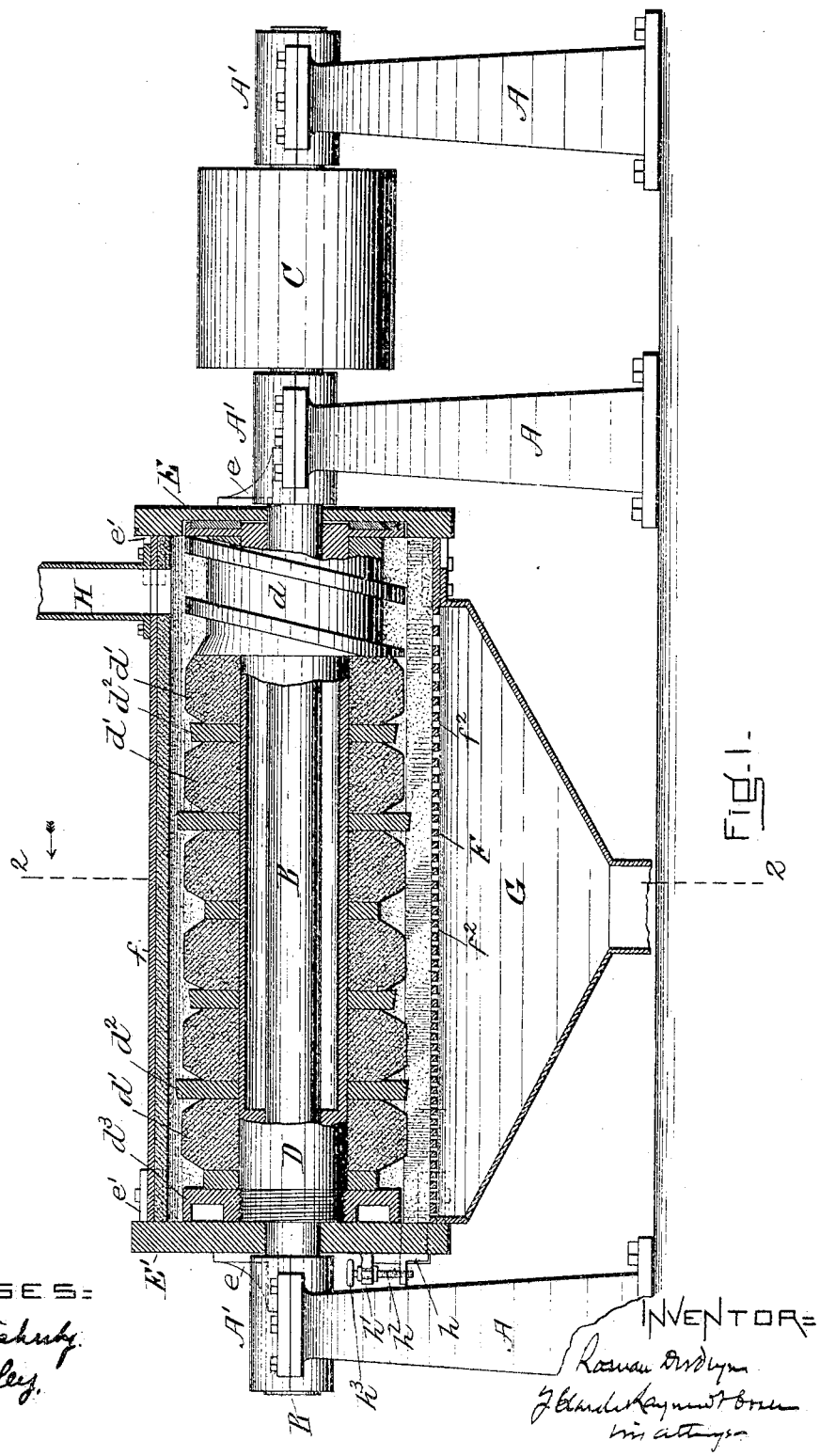
Figure 2:
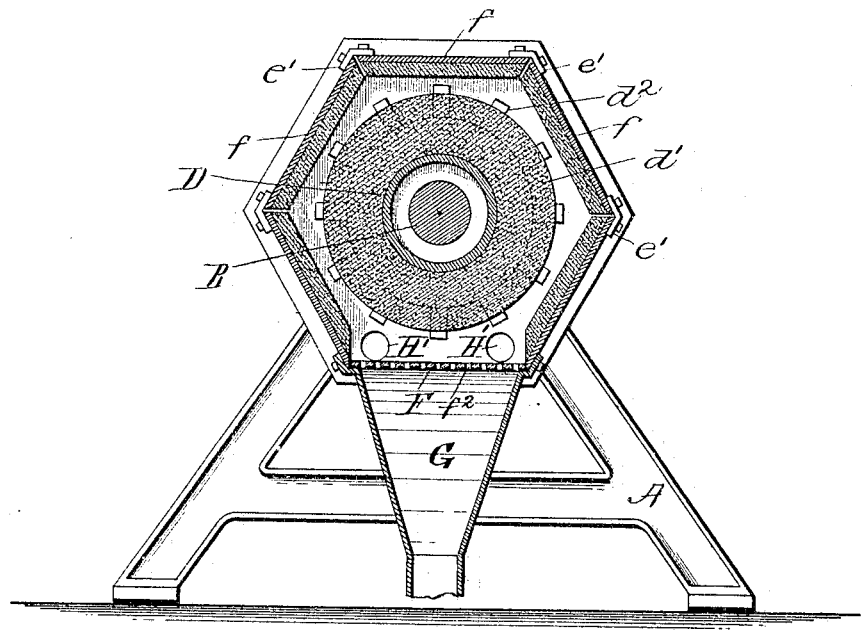
Figure 3:
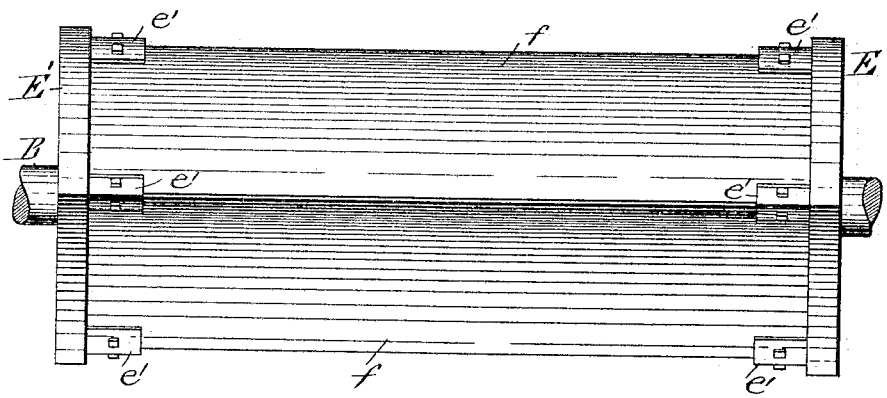

Figure 1 is a longitudinal section of the main operative parts of the machine, the bearings, &c., being in elevation. Fig. 2 is a cross-section on line 2 2 of Fig. 1, and Fig. 3 is a side elevation of the casing.

A A are frames supporting journal-bearings A' A' for the shaft B. This shaft carries a power-pulley C near one end. The shaft carries a sleeve D, upon which are carried the parts which form the feed and grinding roll of the machine. Of these parts, (all of which are like corresponding parts in the Baxter patent above referred to,) $d$ is a feed-screw, $d'$ $d'$ the corundum grinding-disks, and $d^2$ $d^2$ the disks having feeding or stirring arms, which preferably are shaped and arranged to project spirally from the roll, so that in the rotation of the cylinder there is a tendency of the arms not only to stir up the seed, but also to push it toward the outlet end of the machine. The grinding-disks increase in diameter from the inlet to the outlet end of the roll. $d^3$ is a collar which screws onto the sleeve D, whereby these various parts are kept closely against each other and against the feed-screw $d$. The other details of construction of the roll may be like those of the Baxter patent.

The shaft B passes through two heads E E', which are supported from the journal-bearings by brackets $e$, and between these heads are bolted the sections which form the casing of the machine. In the machine shown there are six of these sections; but the number may be varied as thought desirable. The lower section of the casing marked F is a grating, as described below. Each of the other sections, as shown in the drawings, comprises a wooden or metallic backing $f$, to which is attached a slab of corundum or the like, which forms a grinding-surface for the seed. Each section is attached to the one next it and to each head by means of cleats $e'$, which are cast with the head and are bolted to the sections referred to. (See Figs. 2 and 3.) These sections are joined quite closely together, but are preferably made with a slight opening not large enough for the seed to escape, but sufficiently large to afford an opportunity for any lint to work out of the machine.

F is a grating forming the lower side of the casing and having perforations $f^2$, by means of which the lint shall work out, the perforations being preferably larger at the inlet end than at the outlet. This grating opens into a vacuum-chest G, which may be connected with the vacuum-fan, if desirable.

H is the inlet, which comprises a suitable stand-pipe opening within the casing and suitably supported on top of the casing, and H' H' are the outlets, which are small, comparatively speaking, and which may be provided with an adjustable closure of any character. As indicated in Fig. 1, the closure for the outlet comprises a slide $h$, mounted in suitable ways, of which only one is shown, the slide itself being a rectangular piece, the horizontal part of which is provided with a threaded opening forming a nut. A projection $h'$, attached to the front face of the outlet-head E' of the machine, carries a screw $h^2$, the lower end of which lies in a threaded opening in the slide-piece $h$, the upper end of the screw being smooth and held by collars on each side of the projection $h'$, so as to have no longitudinal movement therein, the result being that the rotation of the screw by means of the hand-wheel $h^3$ tends to lift the slide-gate.

In operation seed being introduced through the inlet H and the slide-outlets H' being closed, the seed travels until the casing is filled with seed, whereupon the delinting process begins and the seed is delinted because of the rubbing of the seed against both the casing and the roll and also against each other. When the delinting process has been going on for a short time, the sliding doors are opened more or less, so that the delinted seed may escape, and yet there will be such a back pressure upon the seed that they will be thoroughly stirred up and ground by the roll. The chamber is made smaller at the outlet end than at the inlet in order to compensate for the lint discharged therefrom.

The main peculiarity in this machine lies in having a casing polygonal in cross-section, as shown. The abrading in this case commences when the cylinder is full and the seed will be abraded both by the cylinder and by the slabs of the casing, and to a certain extent the seed will form eddies moving about in the corners of the polygon. This disturbs any regularity of movement of the seed or any tendency to form a roll which will rotate regularly with the cylinder and insures a very much more thorough stirring up of the seed, and hence more thorough grinding off of the lint not only from the main body of the seed, but also from the small ends. As said above, when the delinting begins (and this can be found by experiment) the operator opens the outlet-gates, so that a constant stream of seed will pass out, seed coming in at the inlet to take its place and passing in a more or less spiral fashion entirely around and around the cylinder until it is finally discharged. The lint is expelled both by centrifugal force through the narrow openings between the slabs and also at the bottom, the general pressure caused by the feed-screw assisting in this operation, the exhaust-fan also helping to withdraw the lint.

The grinding-roll shown is substantially like that of the Baxter patent, except that in the present case I prefer that the grinding-roll shall be larger at the outlet end than at the inlet end rather than to make the casing larger at the inlet than at the outlet, which is the specific construction described in the Baxter patent. I do not wish to limit myself, however, to a grinding-roll having disks of exactly the shape shown in the drawings. For example, the disks in question may have a cylindrical periphery, as shown, or may be grooved in the manner shown in the Baxter drawings, the main advantage of grooving these disks being to provide an additional grinding-surface, which in the present machine will be supplied to a greater or less extent by the slabs of corundum. The stirring-arms of the disks $d^2$ should project somewhat beyond the general surface of the grinding-roll.

I have referred to the part F as a "grating." In this term I mean to include either a plate which is perforated or a plate made up of cross-bars, in either case the openings being small enough to retain the seed within the casing and yet allow the lint to escape. As the free lint is greater in quantity at the inlet end of the machine than at the outlet, I prefer that the openings, whether perforations or spaces between bars, shall be larger at the inlet than at the outlet end.

I find a great advantage in this machine from the fact that there is not a large smooth metallic surface forming one of the walls of the chamber inclosing the seed, for the reason that in a machine having such a smooth metallic surface the constant rubbing of the seed against this surface, the seed being agitated by a rapidly-moving grinding-roll, causes the development of a very high temperature, such as in some cases to spoil the seed. In the present case, however, the amount of smooth metallic surface is small, confined as it is to the perforated plate F, substantially the entire chamber being inclosed by a surface which acts to remove the lint.

In view of the larger amount of grinding-surface which this machine has over, for example, a machine of the Baxter type, the roll, and hence the machine, may be made much shorter and may be operated with very much less horse-power than other machines now known to me and accomplish the same amount of work.

The distance between the periphery of the grinding-roll and the nearest point where this roll approaches each slab of corundum should be slightly greater than the largest diameter of the seed. In the drawings this distance is magnified somewhat in order to make clear the general construction of the machine.

What I claim as my invention is—

1. In a delinting-machine, a grinding-cylinder, a polygonal casing surrounding the same, and means whereby the cylinder is rotated within the said casing, as set forth.

2. In a delinting-machine, a grinding-cylinder and means whereby it is rotated, and a polygonal casing comprising a series of slabs having roughened surfaces, said casing being provided with an inlet and outlet, as set forth.

3. In a delinting-machine, a grinding-cylinder and means whereby it is rotated, said cylinder being surrounded by a casing polygonal in shape and having its interior lined with corundum or the like, as described, and means for withdrawing the lint from the chamber within said casing.

4. In a delinting-machine, in combination, a grinding-cylinder and means whereby it is rotated, a polygonal casing one side of which consists of a perforated grating, the other side comprising slabs of grinding material, as and for the purposes set forth.

5. In a delinting-machine, a grinding-cylinder and means whereby it is rotated, and a casing surrounding said cylinder, and comprising a series of slabs having roughened interior surfaces, said slabs being arranged a short distance apart, as and for the purposes set forth.

6. In a delinting-machine, a grinding-cylinder of the character specified, a casing polygonal in cross-section, one side of which comprises a grating, the other sides having grinding interior surfaces, the two together forming a chamber to receive seed to be delinted, having an inlet and an outlet, said chamber being larger at its inlet end than at its outlet end.

R. DERDEYN.

In presence of—
T. M. BLEAKLEY,
LOUIS V. RUIDORF.